(12) United States Patent
Miller et al.

(10) Patent No.: US 10,048,877 B2
(45) Date of Patent: Aug. 14, 2018

(54) PREDICTIVE MEMORY MAINTENANCE

(71) Applicant: INTEL CORPORATION, Santa Clara, CA (US)

(72) Inventors: Shaun M. Miller, Scottsdale, AZ (US); Richard P. Mangold, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 180 days.

(21) Appl. No.: 14/976,921

(22) Filed: Dec. 21, 2015

(65) Prior Publication Data

US 2017/0177246 A1 Jun. 22, 2017

(51) Int. Cl.
| | |
|---|---|
| *G06F 11/00* | (2006.01) |
| *G06F 3/06* | (2006.01) |
| *G06F 11/20* | (2006.01) |

(52) U.S. Cl.
CPC ........... *G06F 3/0619* (2013.01); *G06F 3/065* (2013.01); *G06F 3/0679* (2013.01); *G06F 11/2069* (2013.01)

(58) Field of Classification Search
CPC ............ G06F 11/0727; G06F 11/1072; G06F 11/106; G06F 12/0246; G06F 2212/7201; G11C 13/0064; G11C 13/003; G11C 13/0033; G11C 2213/72; G11C 2213/79; G11C 11/56; G11C 11/5621; G11C 16/04
See application file for complete search history.

(56) References Cited

U.S. PATENT DOCUMENTS

| | | | |
|---|---|---|---|
| 5,488,702 A * | 1/1996 | Byers ................. | G06F 11/1004 714/807 |
| 6,728,156 B2 | 4/2004 | Kilmer et al. | |
| 6,799,288 B2 | 9/2004 | Kohnen et al. | |
| 7,050,252 B1 * | 5/2006 | Vallis ................... | G11B 20/18 360/53 |
| 7,975,192 B2 * | 7/2011 | Sommer ............ | G06F 11/1068 714/719 |
| 8,554,984 B2 * | 10/2013 | Yano ................... | G06F 12/0246 365/185.33 |
| 8,689,041 B2 | 4/2014 | Lu | |

(Continued)

OTHER PUBLICATIONS

Mielke, "Bit Error Rate in NAND Flash Memories" 2008, IEEE, p. 1-1.*

(Continued)

*Primary Examiner* — Bryce P Bonzo
*Assistant Examiner* — Jeison C Arcos
(74) *Attorney, Agent, or Firm* — Konrad Raynes Davda & Victor LLP

(57) ABSTRACT

Predictive memory maintenance in accordance with one aspect of the present description, can anticipate a failure of a selected primary memory die of an array, and pre-load a spare memory die with the data of the selected primary memory die deemed to have a likelihood of failure, prior to any actual failure of the selected memory die. In the event that the selected primary memory die does subsequently fail, the spare memory die pre-loaded with the data of the selected primary memory die can readily take the place of the failed primary memory die with a pre-existing copy of the data of the failed primary memory die. Other aspects are described herein.

23 Claims, 9 Drawing Sheets

(56) References Cited

U.S. PATENT DOCUMENTS

| | | | |
|---|---|---|---|
| 2004/0158775 A1* | 8/2004 | Shibuya | G06F 11/004 714/42 |
| 2005/0041453 A1* | 2/2005 | Brazis | G11C 7/1006 365/63 |
| 2007/0226597 A1* | 9/2007 | Taito | G06F 11/1068 714/785 |
| 2008/0013380 A1* | 1/2008 | Cornwell | G11C 11/5642 365/185.21 |
| 2008/0209282 A1* | 8/2008 | Lee | G11C 11/5621 714/54 |
| 2009/0006793 A1 | 1/2009 | Yamada et al. | |
| 2009/0144583 A1* | 6/2009 | Bruennert | G11C 29/44 714/6.32 |
| 2012/0054582 A1* | 3/2012 | Byom | G11C 16/26 714/773 |
| 2012/0320672 A1* | 12/2012 | Meir | G11C 7/06 365/185.03 |
| 2013/0138871 A1 | 5/2013 | Chiu et al. | |
| 2013/0173970 A1* | 7/2013 | Kleveland | G11C 29/44 714/710 |
| 2014/0082411 A1* | 3/2014 | Warnes | G06F 11/1666 714/6.3 |
| 2014/0237298 A1* | 8/2014 | Pe'er | G11C 16/3418 714/42 |

OTHER PUBLICATIONS

International Search Report and Written Opinion for International Application No. PCT/US2016/063192, dated Mar. 3, 2017, 12 pp. [77.329PCT (ISR & WO)].

* cited by examiner

PREDICTIVE MEMORY MAINTENANCE

TECHNICAL FIELD

The present invention relates generally to devices having spare memory dies.

BACKGROUND

Random access memories (RAMs) often utilize multiple memory dies in which each memory die has a separate semiconductor substrate on which a memory integrated circuit is fabricated. The memory dies are frequently arranged in an array of dies in which the total data storage capacity of the memory array is sum of the storage capacity of each individual memory die added together.

A memory die of the memory array may fail due to various causes. A flash memory may employ a feature often referred to as "die sparing" in which an extra memory die is provided to replace a primary memory die in the event that one of the primary memory dies fails. For example, the memory array may have ten primary memory dies in which the system stores data into and reads data from in connection with regular data input/output operations. An extra memory die may be included in the array as a spare or secondary memory die but is typically not actively used until it is used to replace a failed primary memory die of array. Accordingly, data input/output operations typically access the ten primary memory dies for data storage operations but typically do not access the spare memory die until the spare die replaces a primary memory die.

Upon detection of the failure of a primary memory die, the data which was previously stored in the failed primary memory die is subsequently stored in the spare memory die so that the spare memory die may be used as a primary memory die in the place of the failed primary memory die. Because the data stored in the failed primary memory die may not be retrievable, data recovery techniques may be employed to reconstruct the missing data of the failed primary memory die and store the reconstructed data in the spare memory die to be used as the replacement memory die for the failed memory die.

There are various known error correction code (ECC) techniques for detecting and correcting data errors including for example, block codes such as Reed-Solomon error correction codes, for example, which process data on a block-by-block basis, and convolutional codes, for example, which process data on a bit-by-bit basis. In some applications such as deep space transmission of data between Earth and space probes, and compact disk recording and playback devices, for example, it is known to encode data twice using two different ECC schemes which are concatenated together as an outer ECC scheme and an inner ECC scheme, to operate in sequence on the data. By concatenating the ECC techniques, error detection and correction can be enhanced in some applications, as compared to employing just one of the ECC techniques alone.

DESCRIPTION OF EMBODIMENTS

Predictive memory maintenance in accordance with one aspect of the present description, can anticipate a failure of a selected primary memory die of an array, and pre-load a spare memory die with the data of the selected primary memory die deemed to have a likelihood of failure, prior to any actual failure of the selected memory die. In the event that the selected primary memory die does subsequently fail, the spare memory die pre-loaded with the data of the selected primary memory die can readily take the place of the failed primary memory die with a pre-existing copy of the data of the failed primary memory die. As a result, replacement of the failed primary die with a spare memory die pre-loaded with the data of the failed memory die may be achieved with little or no delay caused by attempts to load the spare memory after the primary memory die has failed. Consequently, interruptions of long duration to the data storage operations as a result of the failure of the primary memory die may be reduced or eliminated.

It is further appreciated that attempts to reconstruct the data of a primary memory die that has failed, may have increased exposure to failure after the primary memory die has failed, particularly in the event that other data errors occur such as the failure or other malfunction of a second primary memory die, for example. In accordance with the present description, by pre-loading the spare memory die with the data of the primary memory die deemed most likely to fail before it has actually failed, the accuracy of the pre-loaded data may be improved as compared to data produced by reconstruction operations initiated after a failure of a memory die has already occurred.

In one embodiment, predictive memory maintenance in accordance with the present description is applied to a non-volatile three dimensional (3D) crosspoint memory. Predictive memory maintenance in accordance with the present description may be applied to systems employing a variety of different types of memory devices including in addition to the aforementioned three dimensional (3D) crosspoint memory, non-volatile memory such as spin torque transfer (STT) Random Access Memory (RAM), phase change memory, magnetic RAM, a resistive memory, nanowire memory, ferro-electric transistor random access memory (FeTRAM), flash memory such as NAND or NOR, and volatile memory such as 2D RAM, for example. Other types of memory may be suitable as well.

Figure 1:
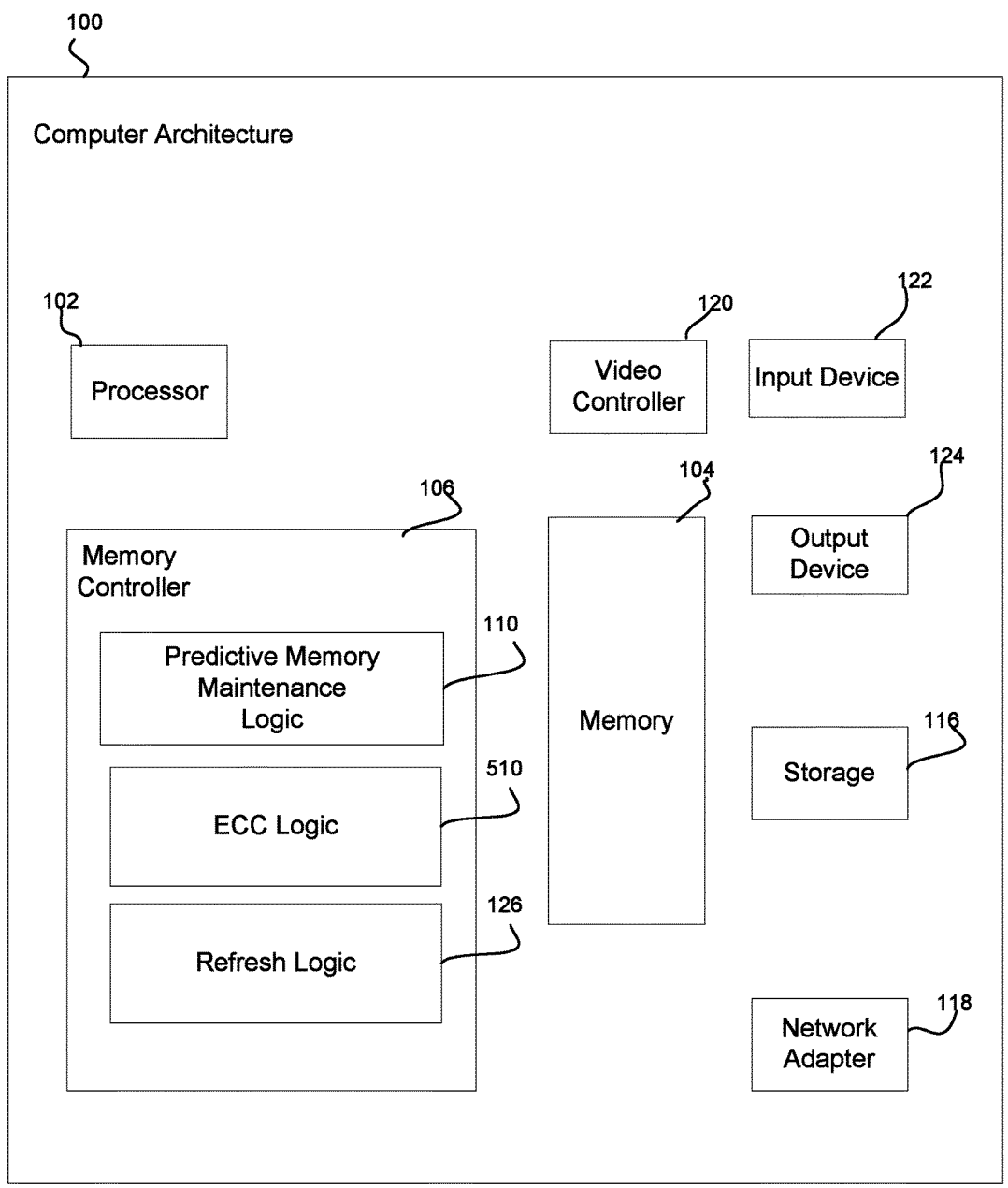
FIG. 1 is a schematic diagram of one embodiment of a computer architecture device employing predictive memory maintenance in accordance with one aspect of the present description.

FIG. 1 illustrates one embodiment of a computer architecture device 100 employing predictive memory maintenance in accordance with one aspect of the present description. The computer architecture device 100 may comprise any computing device known in the art, such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, memory, etc.). The architecture device 100 may include a processor 102 (e.g., a microprocessor), a memory 104 (e.g., a volatile or nonvolatile memory device), and a memory controller 106 which controls input and output operations to and from the memory 104.

As explained in greater detail below, the memory controller 106 includes a predictive memory maintenance logic circuit 110 which can identify and select the primary memory die of an array of the memory 104 which is deemed most likely to fail based upon certain measured performance characteristics, and pre-load a spare memory die with the data of the selected primary memory die prior to failure of the selected primary memory die. As a result, should the selected primary memory die actually fail, the continuance of data transfer operations with a minimum of disruption and delay as a result of failure of a primary memory die of the memory 104, may be facilitated.

In another aspect, the predictive memory maintenance logic circuit 110 can periodically or cyclically reevaluate which primary memory die of an array of the memory 104 is most likely to fail as performance data is accumulated for each primary memory die. As a result, the primary memory die selected as the source for pre-loading the spare memory die may change if the comparative performance characteristics of a different primary memory die deteriorates to a greater extent than a previously selected primary memory die. Accordingly, should a primary memory die actually fail, the probability of having the data of the failed primary memory die already pre-loaded into the spare memory die may be improved.

In still another aspect, predictive memory maintenance operations in accordance with the present description can improve data transfer operations prior to actual failure of a primary memory die. For example, if data correction fails for read data read from the memory, mirrored read data from the spare memory die may be substituted for the read data obtained from the primary memory die selected as most likely to fail. As a result, errors detected in the original read data may be eliminated or may be made more correctable by the substitution of mirrored read data from the spare memory die which is more likely to exhibit a lower bit error rate than the primary memory die selected as the memory die most likely to fail.

In the illustrated embodiment, the memory controller 106 is disposed on one or more semiconductor dies within the device 100 and the predictive memory maintenance logic circuit 110 may be disposed on the same die or dies of the memory controller 106. Although the predictive memory maintenance circuit 110 is depicted as a part of the memory controller 106, it is appreciated that the predictive memory maintenance logic circuit 110 may be fabricated as a part of other circuits of the computer architecture device 100. For example, in one embodiment, one or more of the memory dies of the memory 104 may be included in the same package as the logic die or dies for the memory controller 106 or the predictive memory maintenance logic circuit 110. Thus, in one embodiment, the semiconductor die of the memory controller 106 and dies of the memory 104 may be disposed in a plug in module such as a dual in line memory module (DIMM). Alternatively, one or more of the memory dies of the memory 104 may be housed outside the package of the memory controller logic die, on top of the memory controller logic die, adjacent to the memory controller logic die or in a separate plug in module such as a dual in line memory module (DIMM).

As used herein, the term "automated" includes fully automated in which predictive memory maintenance operations in accordance with the present description take place without any user intervention. Also, the term "automated" includes substantially automated in which predictive memory maintenance operations in accordance with the present description take place with limited user intervention. However, in substantially automated operations, most of predictive memory maintenance operations proceed without any user intervention. In one embodiment, the predictive memory maintenance operations in accordance with the present description are fully automated and take place without any user intervention. In other embodiments, at least 50%, at least 75% or at least 95% of the predictive memory maintenance operations proceed without any user intervention.

The computer architecture device 100 may further include storage 116 (e.g., a non-volatile storage, such as magnetic disk drives, optical disk drives, a tape drive, flash memory, etc.). The storage 116 may employ predictive memory maintenance in accordance with the present description, and may comprise an internal storage device or an attached or network accessible storage. Programs in the storage 116 are loaded into the memory 104 and executed by the processor 102 in a manner known in the art.

The computer architecture device 100 further includes a network controller or adapter 118 to enable communication with a network, such as an Ethernet, a Fiber Channel Arbitrated Loop, etc. Further, the architecture may, in certain embodiments, include a video controller 120 configured to control a display in response to the processor, to render information on a display. The video controller 120 may be embodied on a video card or integrated on integrated circuit components mounted on a motherboard or other substrate. An input device 122 is used to provide user input to the processor 102, and may include a keyboard, mouse, pen-stylus, microphone, touch sensitive display screen, input pins, sockets, or any other activation or input mechanism known in the art. An output device 124 is capable of rendering information transmitted from the processor 102, or other component, such as a display screen or monitor, printer, storage, output pins, sockets, etc. The network adapter 118 may embodied on a network card, such as a Peripheral Component Interconnect (PCI) card, PCI-express, or some other I/O card, or on integrated circuit components mounted on a motherboard or other substrate.

One or more of the components of the device 100 may be omitted, depending upon the particular application. For example, a network router may lack a video controller 120, for example. Also, any one or more of the components of the computer architecture device 100 may include one or more integrated memory circuits having predictive memory maintenance in accordance with the present description.

Figure 2:
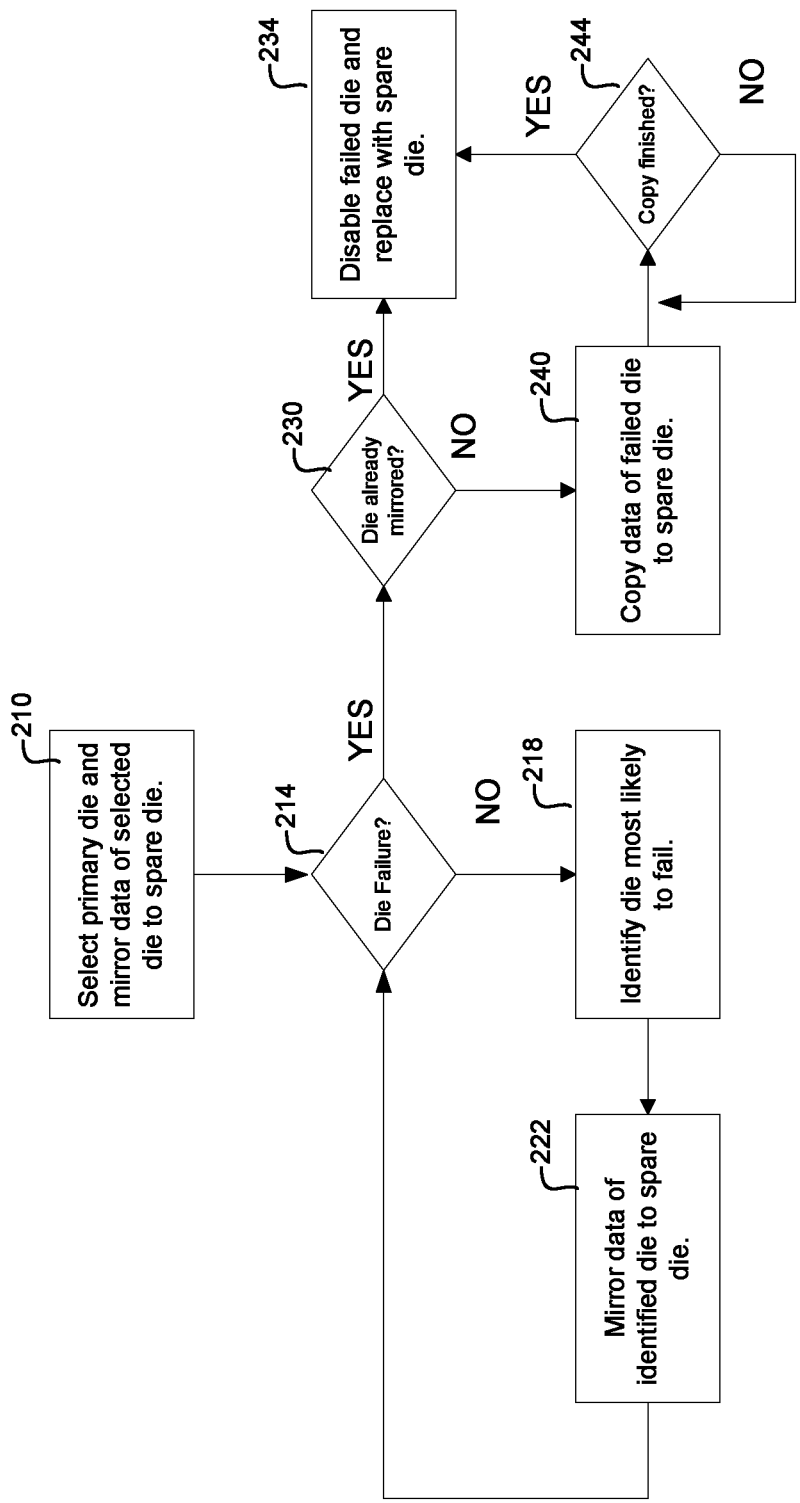
FIG. 2 depicts an example of operations of a memory employing one embodiment of predictive memory maintenance in accordance with the present description.
Figure 3:
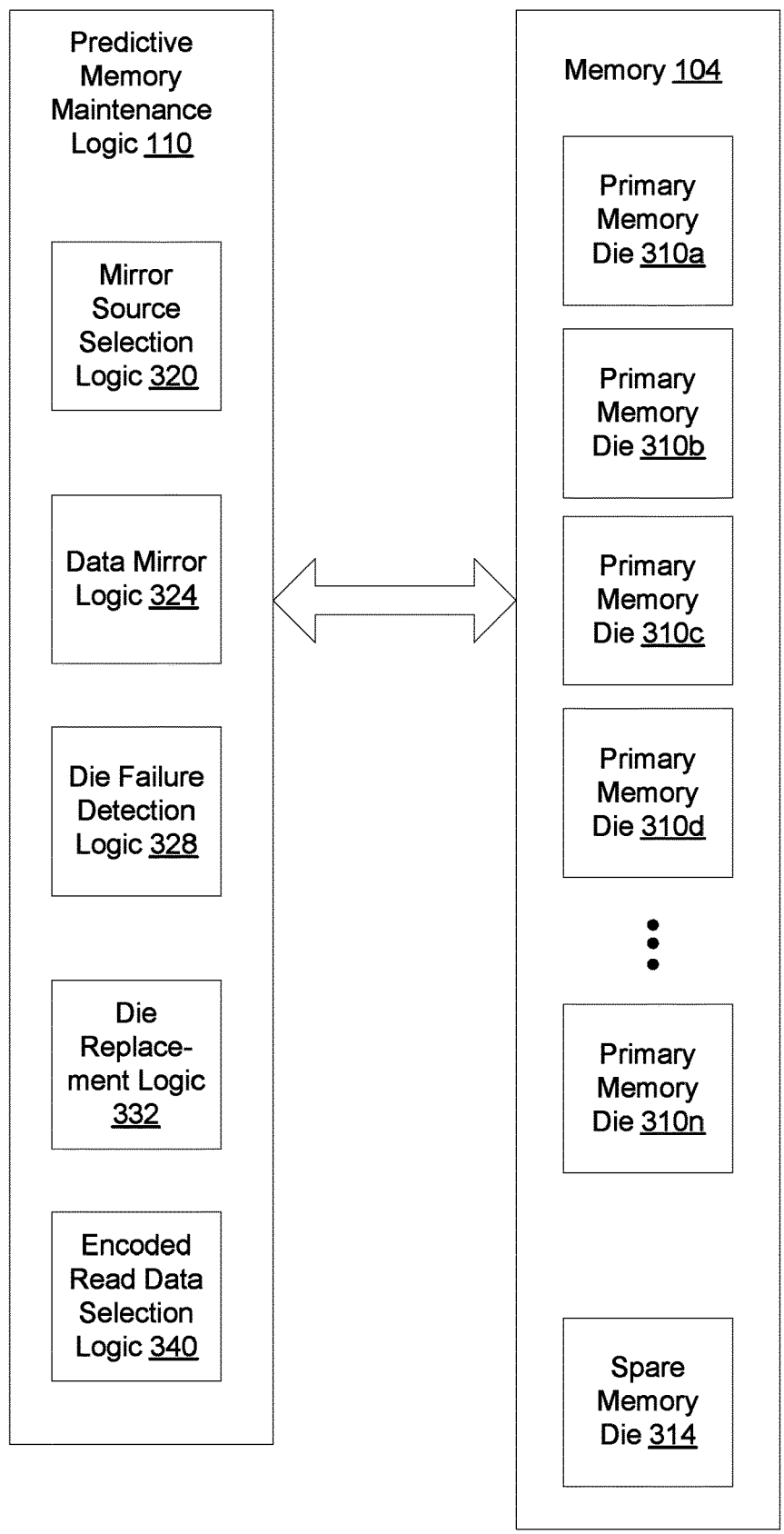
FIG. 3 is a more detailed schematic diagram of one example of predictive memory maintenance logic in accordance with one embodiment of the present description.

FIG. 2 shows an example of operations of the predictive memory maintenance logic 110 of the memory controller 106 (FIG. 1). In one operation, the predictive memory maintenance is initialized by selecting (block 210) an initial primary memory die of the primary memory dies of the memory 104, and mirroring the data of the selected primary memory die to a spare memory die of the memory 104. FIG. 3 shows a more detailed example of the memory 104 having an array of primary memory dies 310a, 310b, ... 310n, together with a spare or secondary memory die 314.

In one embodiment, the memory array may have ten primary memory dies, for example, represented by the primary dies 310a, 310b, ... 310n, in which the system 100 stores data into and reads data from the primary dies 310a, 310b, ... 310n in connection with regular data input/output operations. One of the primary dies 310a, 310b, ... 310n such as primary memory die 310n, for example, is initially selected (block 210) as the source of the mirror data, such that the data stored in the selected primary memory die 310n during regular data transfer operations is also mirrored to the spare memory die 314. As a result, whatever data is stored in the selected memory die (die 310n in this example), that data is also copied or otherwise stored to the spare memory die 314 as well.

In one embodiment, the primary memory die initially selected for mirroring to the spare memory die is selected by mirror source selection logic 320 (FIG. 3) of the predictive memory maintenance logic 110. The mirror source selection logic 320 may be configured to select (block 210, FIG. 2) the initial primary memory die in an arbitrary fashion in some embodiments. Hence, one of the other primary memory dies 310a, 310b ... may be selected as the initial mirror source. However, it is appreciated that other selection criteria may be used by the mirror source selection logic 320 to select an initial primary memory die as the source of the mirror data to be mirrored to the spare memory die 314, depending upon the particular application. Further examples of alternative selection criteria are discussed in greater detail below.

In one embodiment, the data stored in the primary memory die selected as the source, is caused to be mirrored by data mirror logic 324 of the predictive memory maintenance logic 110. It is appreciated that mirroring may be performed by copying data from the source primary memory die to the spare memory die directly or through intermediary storage locations. It is further appreciated that updates to the data stored in the selected primary memory die may be transferred in parallel to update the data of the spare memory die in parallel with the updating of the selected primary memory die. In other embodiments, updates to the selected primary memory die may be copied from the source primary memory die to the spare memory die, for example. Other mirroring techniques may be used so that the data of the selected primary memory die is duplicated in the spare memory die. It is appreciated that at any one time, the updates to the spare memory die may lag those of the selected primary die, in some embodiments.

Previously, an extra memory die was included in a memory array as a spare or secondary memory die but was typically not actively used or accessed until it was used to replace a failed primary memory die of array. Accordingly, in prior systems, data input/output operations typically accessed the ten primary memory dies for data storage operations but typically did not access the spare memory die until the spare die replaced a failed primary memory die. However, in accordance with one aspect of the present description, data of a primary memory die is mirrored to the spare memory die before failure of the primary memory die is detected as described above. In addition, as explained in greater detail below, the data mirrored to the spare memory die 314 may be utilized to increase the reliability of data transfer operations, even before the failure of a primary memory die is detected.

Upon the mirror source selection initialization operation of block 210 and the commencement of memory operations, a determination (block 214) may be made as to whether one of the primary memory dies 310a, 310b, ... 310n has failed during the course of memory operations of the primary memory dies including refresh operations and data transfer operations, for example. Such a failure detection may be made for example by die failure detection logic 328 of the predictive memory maintenance logic 110. Thus, in the embodiment of FIG. 3, the die failure detection logic 328 may be configured to detect whether one of the primary memory dies 310a, 310b ... 310n has failed. If not, a prior selection of a currently operating primary memory may be reevaluated. Thus, either the same one or a different one of the currently operating primary memory dies may be identified (block 218, FIG. 2) as the operational primary memory die which is deemed most likely to fail at some point in the future.

In one embodiment, the selection of an operational primary memory die as the primary memory die deemed most likely to fail, may be made by the mirror source selection logic 320 of the predictive memory maintenance logic 110. The mirror source selection logic 320 may be configured to select (block 218, FIG. 2) the operational primary memory die most likely to fail as a function of various selection criteria, such as memory performance criteria, for example. One example of a memory performance criterion which is suitable for selecting a primary memory die more likely to fail than the other primary memory dies, is a raw bit error rate (RBER) which can be determined and accumulated by the mirror source selection logic 320 of the predictive memory maintenance logic 110, for each operational primary memory die 310a, 310b ... 310n, of the memory 104.

Figure 4A:
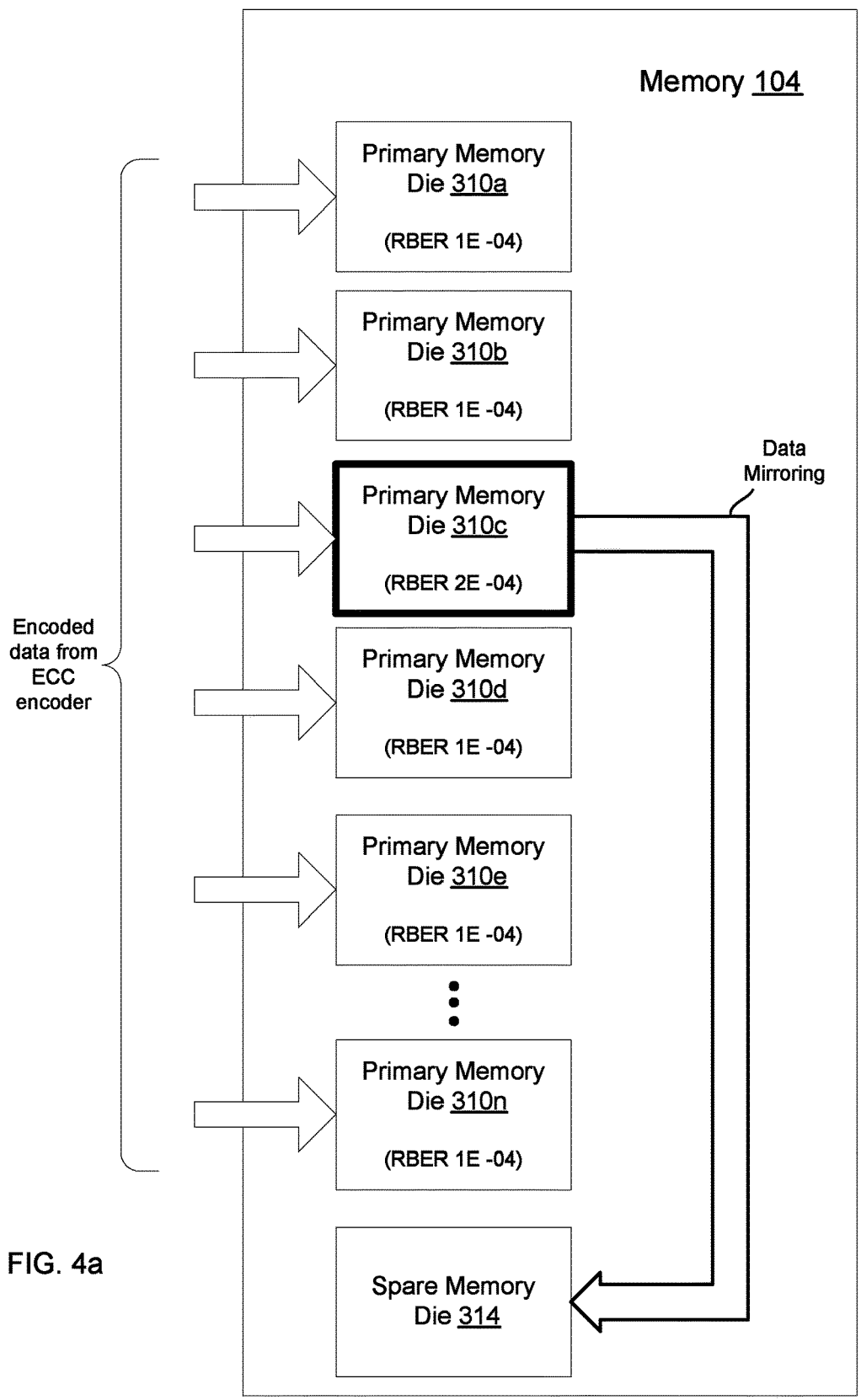
FIG. 4a depicts an example of mirroring operations from a selected operational primary memory die to a spare memory die prior to any detected failure of the selected primary memory die.

FIG. 4a depicts an example of the primary memory dies 310a, 310b, ... 310n in which the mirror source selection logic 320 has been configured to determine an RBER value for each of the primary memory dies 310a, 310b, ... 310n as indicated in parentheses for each primary memory die. The raw bit error rate (RBER) is frequently expressed in terms of a certain number of errors detected in the memory die over the course of a defined number of memory access operations usually expressed as a factor of ten. Thus, in the example of FIG. 4a, the mirror source selection logic 320 has determined an RBER value of 1E-04, for example, for the primary memory die 310a, which indicates that the raw bit error rate for the primary memory die 310a has been determined to be one error for every $10^4$ memory operations accessing the primary memory die 310a. By comparison, the mirror source selection logic 320 has determined an RBER value of 2E-04, for example, for the primary memory die 310c, which indicates that the raw bit error rate for the primary memory die 310c has been determined to be two errors for every $10^4$ memory operations accessing the primary memory die 310a. In the example of FIG. 4a, the mirror source selection logic 320 has determined an RBER value of 1E-04, for each of the remaining primary memory dies 310b, 310e, ... 310n.

In accordance with one embodiment of predictive memory maintenance accordance with the present description, because the primary memory die 310c has been determined to have the highest RBER value of the operational primary memory dies, the primary memory die 310c may be determined (block 218, FIG. 2) to be the operational primary memory die most likely to fail at some point in the future. Accordingly, the primary memory die selected as the source of the data mirroring operation may be changed from the primary memory die 310n initially designated (block 210, FIG. 2) and selected as the source, to the primary memory die 310c which was identified (block 218, FIG. 2) as the operational primary memory die most likely to fail at some point in the future. As a result, the data stored and being stored in the source primary memory die 310c may be mirrored (block 222) to the spare memory die 314 instead of mirroring the data stored and being stored in the initially selected primary memory die 314n. Any updates to the data of the source primary memory die 314c are also mirrored to the spare memory die 314. Once the mirroring operation (block 222) is complete, the spare memory die 314 contains a duplicate of the data of the primary memory die 314c identified in block 218 instead of the primary memory die 314n initially selected in block 210.

In the embodiment of FIG. 4a, the operational primary memory die selected (block 218) as the primary memory die most likely to fail and thus selected as the source primary memory die of the mirroring operation (block 222), is selected as a function of the RBER value determined for each operational primary die. However it is appreciated that other selection criteria may be used by the mirror source selection logic 320 to select a primary memory die as the primary memory die most likely to fail as the source of the mirror data to the spare memory die 314, depending upon the particular application.

For example, memory dies frequently include a temperature sensor which senses the operating temperature of the memory die and outputs temperature data indicating the operating temperature of the memory die. It is appreciated that an operational primary memory die having an operating temperature higher than that of the other operational primary memory dies, may be more likely to fail at a future time. Accordingly, in one embodiment, the operational primary memory die selected (block 218) as the primary memory die most likely to fail and thus selected as the source primary memory die of the mirroring operation (block 222), may be selected as a function of the individual operating temperatures of each operational primary memory die.

In another aspect of predictive memory maintenance in accordance with the present description, it is appreciated that the operations of blocks 214-222 form a memory maintenance operation loop which may be cyclically or periodically repeated. For example, in the embodiment of FIG. 4a, the memory locations of the memory dies are periodically refreshed in repeating refresh cycles generated by refresh logic 140 (FIG. 1) of the memory controller 106. For example, in a three dimensional (3D) crosspoint memory, bitcells over the entire memory are periodically read and the data written back for purposes of improving performance. In each refresh cycle, a determination (block 214, FIG. 2) may be made as to whether a primary memory die has failed, and if not, an operational primary memory die may be identified (block 218) as function of memory die performance, as the primary memory die most likely to fail at a future time, and the data of the primary memory die identified as the one most likely to fail, may be mirrored (block 222) to the spare memory die 314. Hence, upon completion of each mirroring operation (block 222) of a maintenance cycle, the spare memory die is pre-loaded with the data of the primary memory die deemed at that time to be the primary memory die most likely to fail at a future time.

Figure 4B:
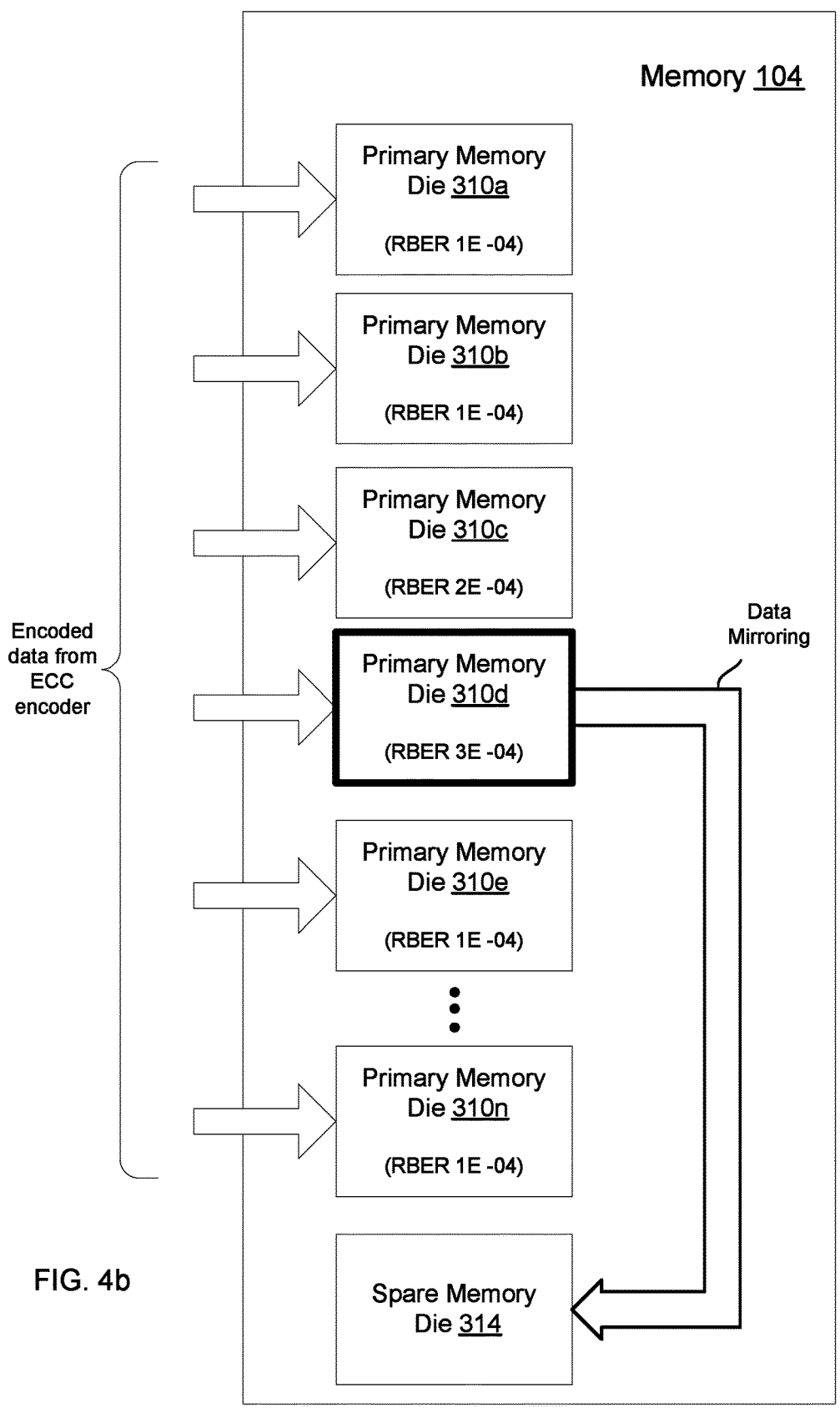
FIG. 4b depicts another example of mirroring operations from a different, selected operational primary memory die to a spare memory die prior to any detected failure of the selected primary memory die.

For example, FIG. 4b depicts maintenance operations in a different maintenance cycle. In this example, the mirror source selection logic 320 has again determined an RBER value of 1E-04, for example, for the primary memory die 310a, and has again has determined an RBER value of 2E-04, for example, for the primary memory die 310c, which indicates that the raw bit error rate for the primary memory die 310c has been determined to be two errors for every $10^4$ memory operations accessing the primary memory die 310c. However, in this example, the mirror source selection logic 320 has determined an RBER value of 3E-04, for the primary memory die 310d, which indicates that the raw bit error rate for the primary memory die 310d has been determined to be three errors for every $10^4$ memory operations accessing the primary memory die 310d. In the example of FIG. 4b, the mirror source selection logic 320 has again determined an RBER value of 1E-04, for each of the remaining primary memory dies 310b, 310e, . . . 310n.

In accordance with one embodiment of predictive memory maintenance accordance with the present description, because the primary memory die 310d has been determined to have the highest RBER value of the operational primary memory dies, the primary memory die 310d may be determined (block 218, FIG. 2) to be the operational primary memory die most likely to fail at some point in the future. Accordingly, the source primary memory die of the data mirroring operation may be changed from the primary memory die 310c previously identified (block 218, FIG. 2) in a prior maintenance cycle of FIG. 4a, as the source primary memory die, to the primary memory die 310d which was identified (block 218, FIG. 2) in the current maintenance cycle of FIG. 4b as the operational primary memory die most likely to fail at some point in the future. As a result, as shown in FIG. 4b, the data stored in the source primary memory die 310d may be mirrored (block 222) to the spare memory die 314 instead of mirroring (FIG. 4a), the data stored in the previously selected primary memory die 314c as shown in FIG. 4a. Any updates to the data of the source primary memory die 314d are also mirrored to the spare memory die 314. Once the mirroring operation (block 222) is complete, the spare memory die 314 contains a duplicate of the data of the primary memory die 310d identified in block 218 instead of the primary memory die 314c previously selected in a prior maintenance cycle.

In the event that a primary memory die does fail (block 214, FIG. 2) as detected by the die failure detection logic 328 (FIG. 3), a determination is made as to whether (block 230), the data for the failed primary memory die has already been mirrored by the data mirror logic 324 (FIG. 3) to the spare memory die 314. If so, the failed primary memory die may be disabled (block 234) and replaced with the spare memory die 314 which has already been pre-loaded with the data of the failed primary memory die.

In the example of FIG. 4b, the data for the primary memory die 310d was selected to be mirrored to the spare memory die 314. Accordingly, if the primary memory die 310d was the primary memory die which failed as predicted (block 218, FIG. 2), the data for the failed primary memory die 310d may have already (block 230, FIG. 2) been mirrored (block 222, FIG. 2) by the data mirror logic 324 (FIG. 3) to the spare memory die 314. If so, the failed primary memory die 310d may be disabled (block 234) and replaced with the spare memory die 314 which has already been pre-loaded with the data of the failed primary memory die 310d. As a result, disruptions in memory operations due to failure of the primary memory die may be reduced. For example, delays due to reconstructing data of the failed primary memory die 310d and copying the reconstructed data to the spare memory die may be avoided where the data of the failed primary memory die 310d has already (block 230, FIG. 2) been mirrored (block 222, FIG. 2) to the spare memory die 314 prior to detection (block 214) of the failure of the primary memory die.

In one embodiment, a die replacement logic 332 (FIG. 3) of the predictive memory maintenance logic 110 is configured to disable the failed primary memory die and replace the disabled primary memory die with the spare memory die 314. Accordingly, data transfer operations which would have been directed to access the failed primary memory die, are instead redirected to access the spare memory die 314. In this manner, the spare memory die 314 pre-loaded with the data of the failed primary memory die, takes the place of the failed and disabled primary memory die in the memory operations of the memory 104.

As previously mentioned, in the example of FIG. 4b, the data for the primary memory die 310d was selected to be mirrored to the spare memory die 314. Accordingly, if the primary memory die 310d was the primary memory die which failed as predicted (block 218, FIG. 2), it is anticipated that the mirroring of the data for the failed primary memory die 310d by the data mirror logic 324 (FIG. 3) to the spare memory die 314, may not have been completed (block 230, FIG. 2) at the time that the failure of the primary memory die 310d is detected (block 214). If so, the remaining data of the primary memory die 310 may be copied (block 240) by the data mirror logic 324 (FIG. 3) to the spare memory die 314, until the copying operation is completed (block 244). It is appreciated that the data of the failed primary memory die 310d may not be retrieved from the memory die 310d due to its failure. Accordingly, the remaining data may be reconstructed as explained below, and copied to the spare memory die 314. Once the reconstructing and copying operations are completed (block 244, FIG. 2), the failed primary memory die 310d may be disabled (block 234) and replaced with the spare memory die 314 as explained above.

In the example of FIG. 4b, the data for the primary memory die 310d was selected to be mirrored to the spare memory die 314. Accordingly, if a primary memory die other than the primary memory die 310d was the primary memory die which failed, contrary to the prediction (block 218, FIG. 2) that primary memory die 310d was the die most likely to fail, the data for the failed primary memory die will not have already (block 230, FIG. 2) been mirrored by the data mirror logic 324 (FIG. 3) to the spare memory die 314. Accordingly, the data for the failed primary memory die is reconstructed and copied (block 240) by the data mirror logic 324 (FIG. 3) to the spare memory die 314. Once the data reconstructing and copying operations are completed (block 244, FIG. 2), the failed primary memory die may be disabled (block 234) and replaced with the spare memory die 314 as explained above.

Because the data stored in a failed primary memory die may not be retrievable, error correction code (ECC) logic may be employed to reconstruct the missing data from the failed primary memory die and store the reconstructed data in the spare memory die to be used as the replacement memory die for the failed memory die. Moreover, in one aspect of the present description, the mirrored data stored in the spare memory die may be utilized even before the primary memory die fails, to facilitate error detection and correction using error correction codes.

One example of a suitable error correction code is a Reed-Solomon error correction code which is a block code which encodes blocks of data in symbols to facilitate error detection and correction. It is appreciated that other types of error correction codes may be employed in predictive memory maintenance in accordance with the present description. For example, both block and convolutional codes may be suitable for predictive memory maintenance in accordance with the present description. Also, both systematic and nonsystematic codes may be suitable for predictive memory maintenance in accordance with the present description. In a systematic scheme, an encoder attaches to the original write data a number of check bits (such as parity data, for example), which are derived from the data bits by an appropriate deterministic algorithm. In a system that uses a non-systematic code, the original message is transformed into an encoded message that typically has at least as many bits as the original message. Additional examples of codes which may be suitable are concatenated codes, recursive codes, non-recursive codes, repetition codes, Hamming codes, multidimensional parity-check codes, turbo codes, low-density parity-check codes (LDPC), etc.

Figure 5:
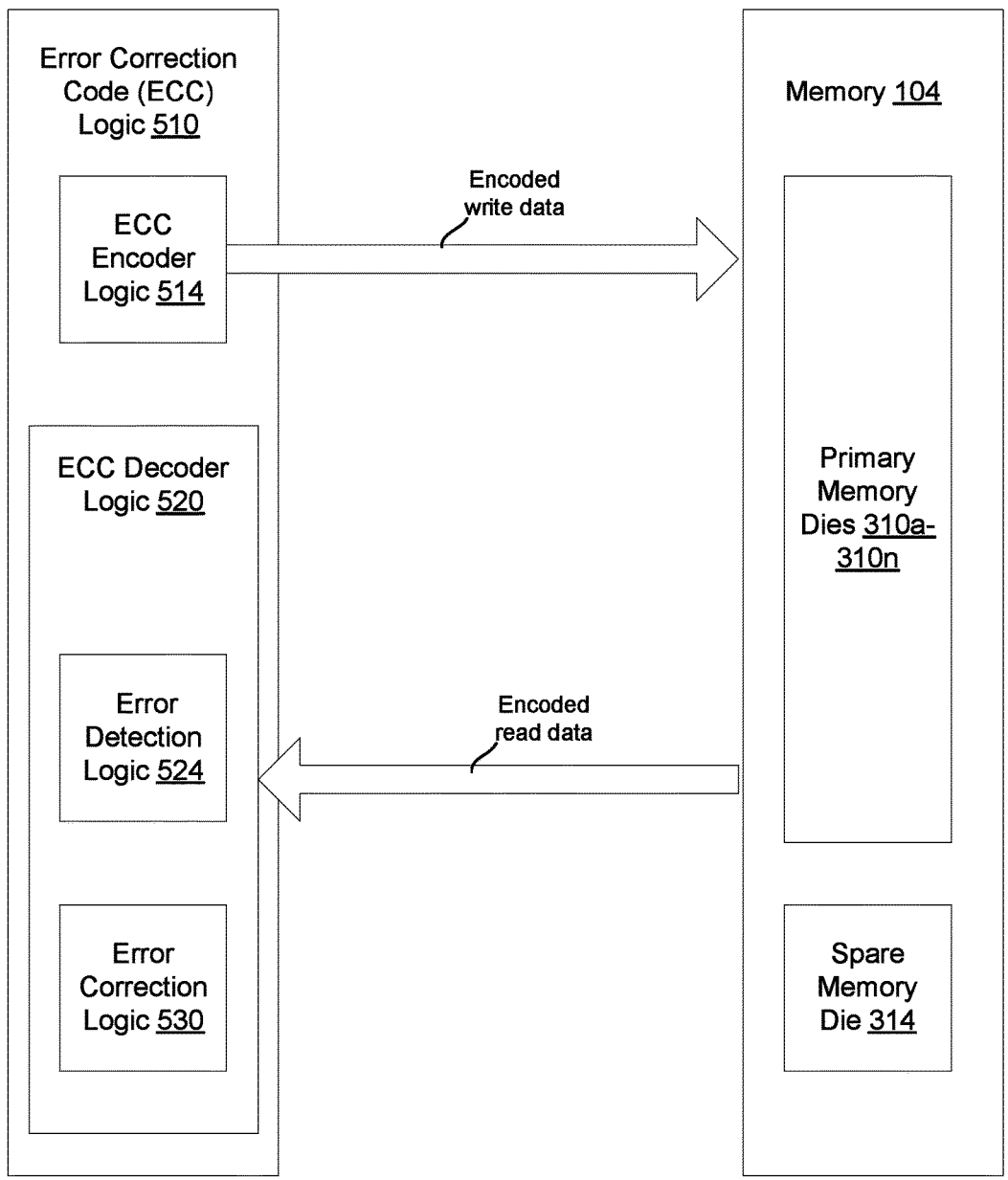
FIG. 5 is a schematic diagram of one embodiment of error correction code logic employing predictive memory maintenance in accordance with one aspect of the present description.

In the illustrated embodiment, the memory controller 106 includes error correction code (ECC) logic 510 (FIG. 5) which encodes the write data to be stored in the memory 104, and decodes the encoded read data to detect errors and correct them if possible. Accordingly, an ECC encoder logic 514 is configured to encode write data for the memory 104 in an error correction code (such as a Reed-Solomon error correction code, for example). The encoded write data is stored in the primary memory dies 310a, 310b . . . 310n of the memory 104 in the course of regular write data transfer operations. For example, in one embodiment, a line of encoded write data stored in the primary memory dies 310a, 310b . . . 310n may be 320 bytes long and includes 256 bytes of user data and 64 bytes of metadata relating to the 256 bytes of user data. For example, the 64 bytes of metadata may include parity or other redundant data which may be used for error detection and correction.

Accordingly, in the illustrated embodiment, each of the primary memory dies 310a, 310b . . . 310n stores 32 bytes of encoded write data of the 320 byte long line of encoded write data. In addition, the 32 bytes of encoded write data being directed to the selected (block 218, FIG. 2) primary memory die deemed most likely to fail in the future, are also mirrored (block 222) to the spare memory die 314 as described above. It is appreciated that in other embodiments, the size of a line of encoded write data and the amount of encoded write data stored in each memory die, may vary, depending upon the particular application.

Figure 6:
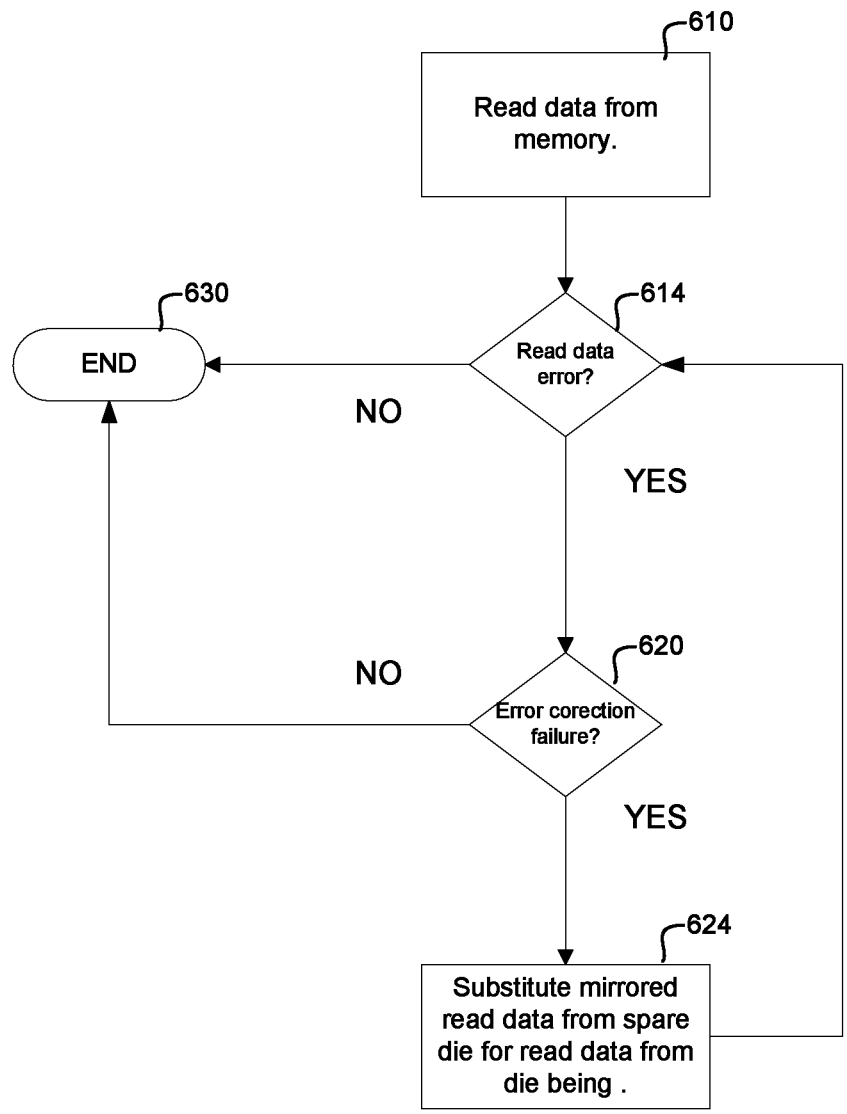
FIG. 6 depicts an example of error detection and correction operations of the error correction code logic of FIG. 5 in connection with predictive memory maintenance in accordance with one aspect of the present description.
Figure 7A:
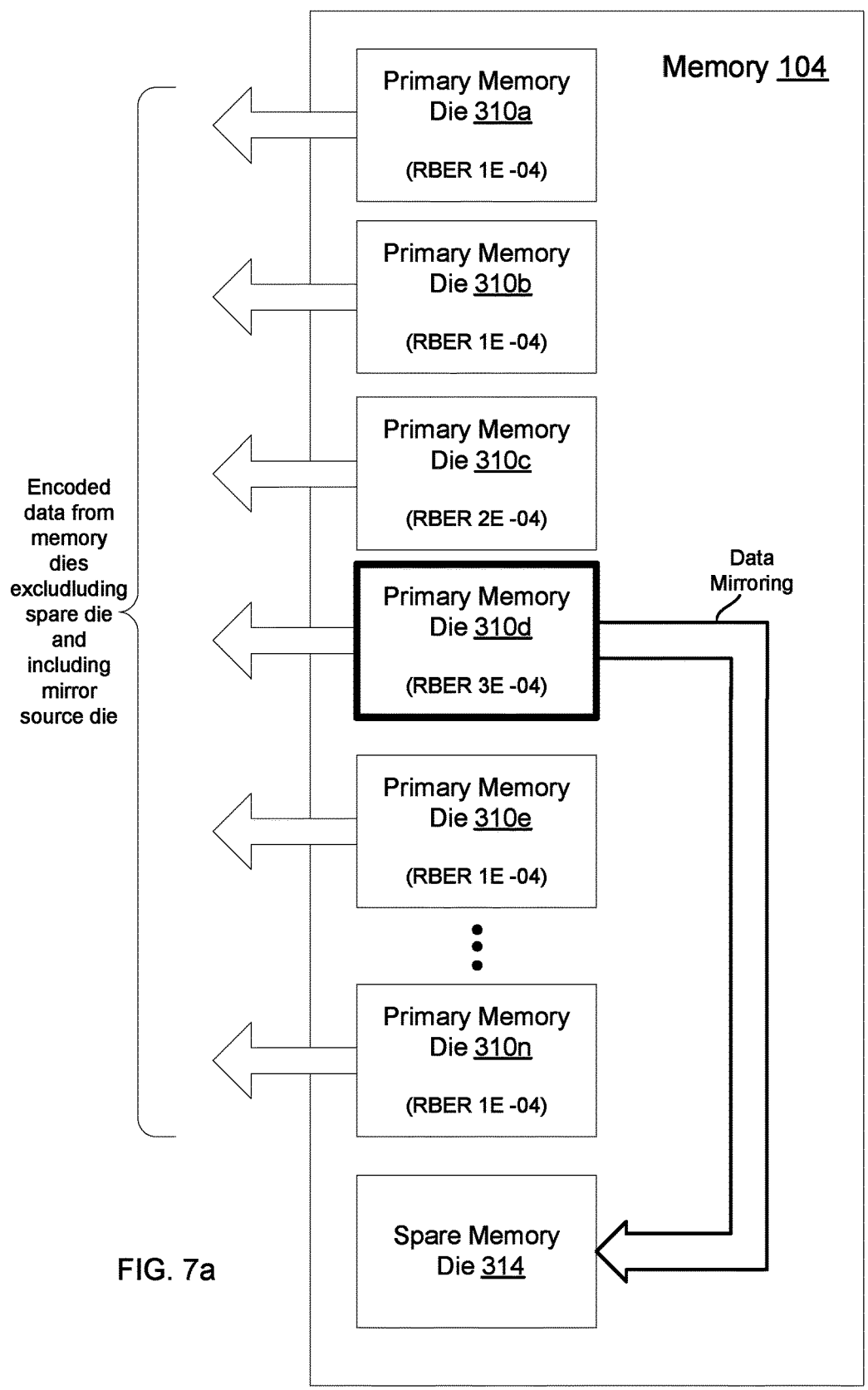
FIG. 7a depicts an example of a data read operation of encoded read data for the error correction code logic of FIG. 5 in connection with predictive memory maintenance in accordance with one aspect of the present description.

FIG. 6 depicts an example of operations of the predictive memory maintenance logic 110 in connection with the encoded read data transfer operations of the ECC logic 510. In one operation, encoded read data is read (block 610) from the primary memory dies 310a, 310b . . . 310n of the memory 104 and decoded by ECC decoder logic 520 of the ECC logic 510. FIG. 7a depicts an example of encoded read data being read from each of the primary memory dies 310a, 310b 310n. In the example of FIG. 7a, the encoded read data mirrored to the spare memory die 314 from the primary memory die 310d which was determined the most likely to fail, is not read from the memory 104 or otherwise used at this time. The ECC decoder logic 520 is configured to decode encoded read data which has been encoded by the ECC encoder logic 514 with an error correction code (such as a Reed-Solomon error correction code, for example).

A determination (block 614) is made as to whether the decoded read data read from the primary memory dies 310a, 310b . . . 310n contains errors. An error detection logic 524 (FIG. 5) of the ECC decoder logic 520 is configured to detect, in accordance with the error correction code, whether the decoded read data read from the primary memory dies 310a, 310b . . . 310n of the memory 104 contains errors. If so an attempt is made to correct the detected errors and a determination (block 620) is made as to whether the attempted error correction was successful. In the illustrated embodiment, an error correction logic 530 (FIG. 5) of the ECC decoder logic 520 is configured to correct detected errors in accordance with the error correction code. As a general matter, the more redundant data added by the ECC encoding, the greater the number of detected errors that may be corrected. If the number of detected errors exceeds a certain maximum which is a function of the ECC encoding, the error correction may fail (block 620, FIG. 6).

Figure 7B:
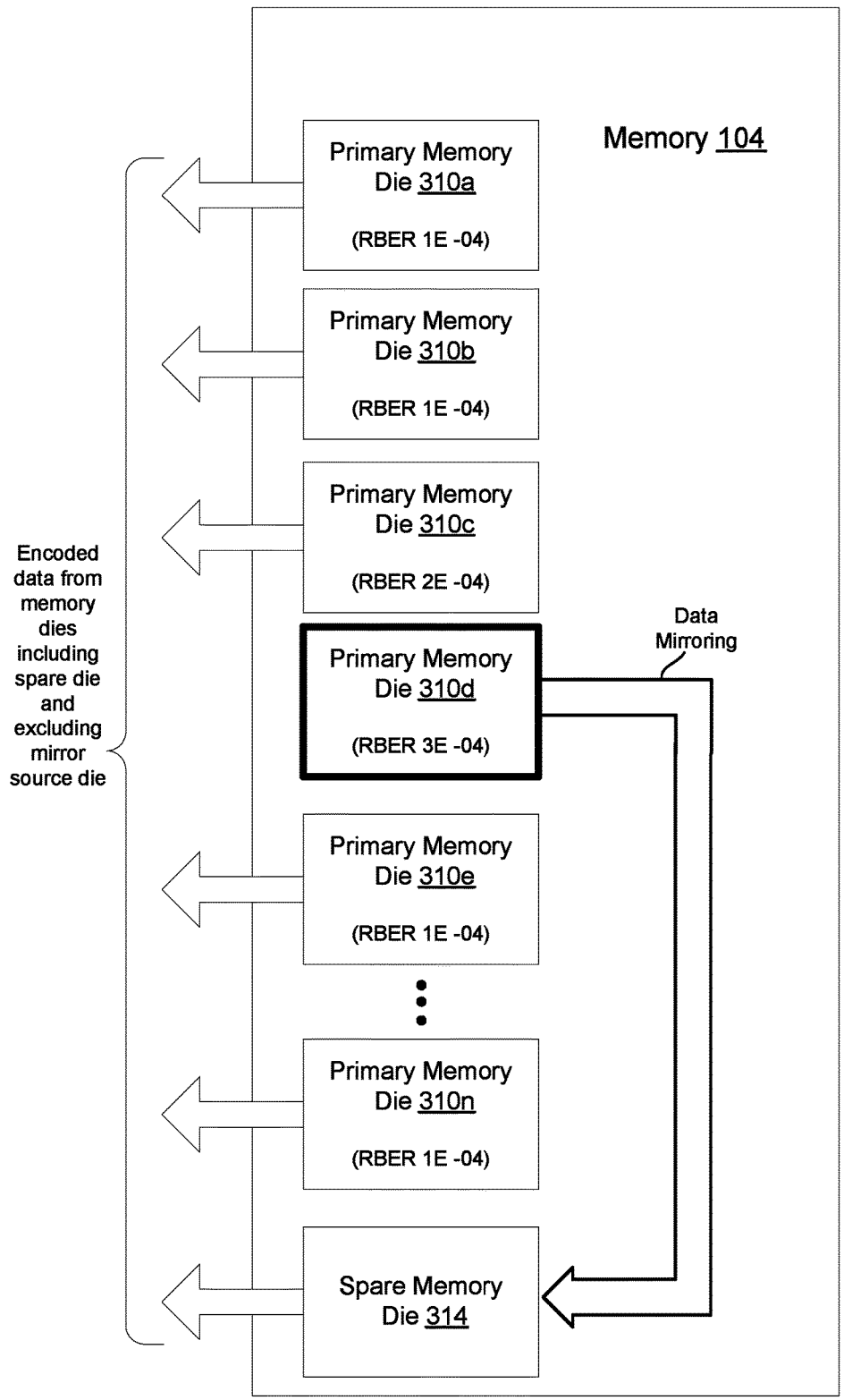
FIG. 7b depicts another example of a data read operation of encoded read data for the error correction code logic of FIG. 5 in connection with predictive memory maintenance in accordance with one aspect of the present description.

In accordance with another aspect of the present description, ECC error correction may employ predictive memory maintenance to improve error correction before failure of a primary memory die is detected. For example, in the embodiment of FIG. 6, if the number of detected errors in the decoded read data from the primary memories dies (FIG. 7a) causes the error correction to fail (block 620, FIG. 6), the encoded data which was mirrored to the spare memory die 314 may be substituted (block 624) for the encoded read data as shown in the example of FIG. 7b. Thus, in the example of FIG. 7b, the encoded read data mirrored to the spare memory die 314 is read by the ECC decoder logic 520. Conversely, in the example of FIG. 7b, the encoded read data stored in the primary memory die 310d which was determined the most likely to fail, is not read from the memory 104 or otherwise used at this time. An encoded read data selection logic 340 (FIG. 3) of the predictive memory maintenance logic 110 is configured to select (block 624) the encoded data which was mirrored to the spare memory die 314 and substitute it for the read operation, as shown in the example of FIG. 7b, instead of the example of FIG. 7a in which the encoded read data stored in the selected primary memory die 310d which was determined the die most likely to fail, was utilized for the read operation.

Accordingly, the encoded read data from the primary memory dies 310a, 310b, 310c, 310e . . . 310n (FIG. 7b) together with the encoded read data from the spare memory die 314 instead of the encoded read data from the primary memory die 310d deemed most likely to fail, may be decoded by the decoded by ECC decoder logic 520 (FIG. 5) of the ECC logic 510. A determination (block 614, FIG. 6) may again be made as to whether the decoded read data, this time read from the primary memory dies 310a, 310b, 310c, 310e . . . 310n together with the decoded read data from the spare memory die 314 instead of the primary memory die 310d deemed most likely to fail, contains errors. It is appreciated that in some embodiments, by substituting the read data from the spare memory die 314, for the data of the primary memory die 310d deemed most likely to fail, errors from the read data may be eliminated, obviating any subsequent error correction. If so, the read operation may be successfully concluded (block 630).

If it is determined (block 614) that the decoded read data read from the primary memory dies 310a, 310b, 310c, 310e . . . 310n together with the decoded read data from the spare memory die 314 instead of the primary memory die 310d deemed most likely to fail, does contain errors, an attempt may again be made to correct the detected errors and a determination (block 620) is made as to whether the attempted error correction was successful. It is appreciated that in some embodiments, by substituting the read data from the spare memory die 314, for the data of the primary memory die 310d deemed most likely to fail, errors from the read data may be reduced sufficiently to come within the error correction capability of the error correction logic 530 (FIG. 5) of the ECC decoder logic 520. For example, if a data errors occurred in the encoded read data from the primary memory die 310d deemed most likely to fail in addition to a data error occurring in another primary memory die, but the encoded read data from the spare memory die is free of data errors or contains fewer errors, by substituting (block 624) the encoded read data from the spare memory 314 for the encoded read data from the primary memory die 310d deemed most likely to fail, the number of data errors are reduced such that error correction may be successful and the data transfer may be successfully concluded (block 630).

In another aspect of the present description, the source selection logic 320 FIG. 3) is configured to accumulate over a period of time, comparative statistical performance data representing the comparative performance of each primary memory die of the memory with respect to a particular performance criteria. For example, as previously mentioned, the error detection logic 524 (FIG. 5) of the ECC decoder 520, is configured to detect errors in the decoded read data read from the memory 104. The source selection logic 320 may be configured to keep track of the errors detected for each primary memory die and calculate a raw bit error rate (RBER) for each primary memory die of the memory 104. The calculated RBER may be updated periodically such as in each refresh cycle, for example. It is appreciated that other statistical performance data may be accumulated to provide a basis for the source selection logic 320 to select an operational memory die of the memory as the operational primary memory die most likely to fail. The source selection logic may be configured to select the primary memory die as a function of the operational memory die having the worst comparative performance over the period of time.

EXAMPLES

The following examples pertain to further embodiments.
Example 1 is an apparatus, comprising:
selection logic configured to determine memory performance of operational memory dies of a memory, and select an operational memory die of the memory as a function of memory die performance; and
data mirror logic configured to mirror data for the selected operational memory die to a spare memory die.
In Example 2, the subject matter of Examples 1-8 (excluding the present Example) can optionally include:
die failure detection logic configured to detect failure of the selected operational memory die; and
die replacement logic configured to, in response detection of the failure of the selected operational memory die, disable the failed operational memory die and replace the failed operational memory die with the spare memory die wherein the spare memory die has data mirrored from the selected operational memory die prior to a detection of a failure of the selected operational memory die.
In Example 3, the subject matter of Examples 1-8 (excluding the present Example) can optionally include:
error correction code logic configured to read data from the operational memory dies of the memory including the selected operational memory die, wherein the read data is encoded in accordance with an error correction code, the error correction code logic having decoder logic configured to decode the encoded read data, error detection logic configured to detect an error in the decoded read data, and error correction logic configured to attempt to correct a detected error in the decoded read data, wherein the error correction code logic is further configured to, in response to a failure by the error correction logic to correct a detected error in the decoded read data, read data from the spare memory die wherein the read data is encoded in accordance with an error correction code, and substitute the encoded read data from the spare memory die for the encoded read data from the selected operational memory die.

In Example 4, the subject matter of Examples 1-8 (excluding the present Example) can optionally include wherein the decoder logic is further configured to decode the encoded read data which includes the encoded read data from the spare memory die, and wherein the error detection logic is further configured to detect an error in the decoded read data which includes the decoded read data from the spare memory die, and wherein the error correction logic is further configured to correct a detected error in the decoded read data which includes the decoded read data from the spare memory die.

In Example 5 the subject matter of Examples 1-8 (excluding the present Example) can optionally include cyclical predictive memory maintenance logic configured to cyclically perform predictive maintenance of the memory in a plurality of maintenance cycles, wherein in each maintenance cycle, said selection logic is further configured to determine in each maintenance cycle, the memory performance of the operational memory dies of the memory, and to select an operational memory die of the memory as a function of the memory die performance; and wherein said data mirror logic is further configured to in each maintenance cycle, mirror data for the selected operational memory die to the spare memory die.

In Example 6, the subject matter of Examples 1-8 (excluding the present Example) can optionally include cyclical refresh logic configured to cyclically perform refreshing of the memory in a plurality of refresh cycles, wherein the predictive memory maintenance logic is further configured to perform each maintenance cycle in association with a refresh cycle.

In Example 7, the subject matter of Examples 1-8 (excluding the present Example) can optionally include wherein said selection logic includes logic configured to determine memory performance of operational memory dies of the memory, including logic configured to accumulate over a period of time, comparative statistical performance data representing the comparative performance of each memory die of the memory with respect to a particular performance criteria, and logic configured to select an operational memory die of the memory as a function of the operational memory die having the worst comparative performance over the period of time.

In Example 8, the subject matter of Examples 1-8 (excluding the present Example) can optionally include wherein the performance criteria includes raw bit error rate.

Example 9 is a system for use with a display, comprising:
a processor;
a video controller configured to control the display in response to the processor;
a memory configured to store data from the processor and having a plurality of memory dies including a spare memory die; and
a memory controller configured to control the memory, said memory controller including:
selection logic configured to determine memory performance of operational memory dies of the memory, and select an operational memory die of the memory as a function of memory die performance; and
data mirror logic configured to mirror data for the selected operational memory die to the spare memory die.

In Example 10, the subject matter of Examples 9-16 (excluding the present Example) can optionally include wherein the memory controller further includes:
die failure detection logic configured to detect failure of the selected operational memory die; and
die replacement logic configured to, in response detection of the failure of the selected operational memory die, disable the failed operational memory die and replace the failed operational memory die with the spare memory die wherein the spare memory die has data mirrored from the selected operational memory die prior to a detection of a failure of the selected operational memory die.

In Example 11, the subject matter of Examples 9-16 (excluding the present Example) can optionally include wherein the memory controller further includes:
error correction code logic configured to read data from the operational memory dies of the memory including the selected operational memory die, wherein the read data is encoded in accordance with an error correction code, the error correction code logic having decoder logic configured to decode the encoded read data, error detection logic configured to detect an error in the decoded read data, and error correction logic configured to attempt to correct a detected error in the decoded read data, wherein the error correction code logic is further configured to, in response to a failure by the error correction logic to correct a detected error in the decoded read data, read data from the spare memory die wherein the read data is encoded in accordance with an error correction code, and substitute the encoded read data from the spare memory die for the encoded read data from the selected operational memory die.

In Example 12, the subject matter of Examples 9-16 (excluding the present Example) can optionally include wherein the decoder logic is further configured to decode the encoded read data which includes the encoded read data from the spare memory die, and wherein the error detection logic is further configured to detect an error in the decoded read data which includes the decoded read data from the spare memory die, and wherein the error correction logic is further configured to correct a detected error in the decoded read data which includes the decoded read data from the spare memory die.

In Example 13, the subject matter of Examples 9-16 (excluding the present Example) can optionally include wherein the memory controller further includes cyclical predictive memory maintenance logic configured to cyclically perform predictive maintenance of the memory in a plurality of maintenance cycles, wherein in each maintenance cycle, said selection logic is further configured to determine in each maintenance cycle, the memory performance of the operational memory dies of the memory, and to select an operational memory die of the memory as a function of the memory die performance; and wherein said data mirror logic is further configured to in each maintenance cycle, mirror data for the selected operational memory die to the spare memory die.

In Example 14, the subject matter of Examples 9-16 (excluding the present Example) can optionally include wherein the memory controller further includes refresh logic configured to cyclically performing refreshing of the memory in a plurality of refresh cycles, wherein the cyclical predictive memory maintenance logic is further configured to perform each maintenance cycle in association with a refresh cycle.

In Example 15, the subject matter of Examples 9-16 (excluding the present Example) can optionally include wherein said selection logic includes logic configured to determine memory performance of operational memory dies of the memory, including logic configured to accumulate over a period of time, comparative statistical performance data representing the comparative performance of each memory die of the memory with respect to a particular performance criteria, and logic configured to select an operational memory die of the memory as a function of the operational memory die having the worst comparative performance over the period of time.

In Example 16, the subject matter of Examples 9-16 (excluding the present Example) can optionally include wherein the performance criteria includes raw bit error rate.

Example 17 is a method, comprising:
determining memory performance of operational memory dies of a memory;
selecting an operational memory die of the memory as a function of memory die performance; and
mirroring data for the selected operational memory die to a spare memory die.

In Example 18, the subject matter of Examples 17-24 (excluding the present Example) can optionally include detecting a failure of the selected operational memory die, in response to detection of a failure of the selected operational memory die, disabling the failed operational memory die and replacing the failed operational memory die with the spare memory die wherein the spare memory die has data mirrored from the selected operational memory die prior to the detection of the failure of the selected operational memory die.

In Example 19, the subject matter of Examples 17-24 (excluding the present Example) can optionally include
reading data from the operational memory dies of the memory including the selected operational memory die;
attempting error correction of the read data if the read data contains an error;
if the error correction is unsuccessful, modifying the read data by replacing read data read from the selected operational memory die with read data read from the spare memory die prior to detection of a failure of the selected operational memory die; and
attempting error correction of the modified read data if the modified read data contains an error.

In Example 20, the subject matter of Examples 17-24 (excluding the present Example) can optionally include cyclically performing maintenance of the memory in a plurality of maintenance cycles, each maintenance cycle including:
said determining memory performance of operational memory dies of the memory;
said selecting an operational memory die of the memory as a function of memory die performance; and
said mirroring data of the selected operational memory die to the spare memory die.

In Example 21, the subject matter of Examples 17-24 (excluding the present Example) can optionally include cyclically performing refreshing of the memory in a plurality of refresh cycles wherein each maintenance cycle is performed in association with a refresh cycle.

In Example 22, the subject matter of Examples 17-24 (excluding the present Example) can optionally include wherein said determining memory performance of operational memory dies of the memory includes accumulating over a period of time, comparative statistical performance data representing the comparative performance of each memory die of the memory with respect to a particular performance criteria, and wherein said selecting an operational memory die of the memory as a function of memory die performance includes selecting the operational memory die having the worst comparative performance over the period of time.

In Example 23, the subject matter of Examples 17-24 (excluding the present Example) can optionally include wherein the performance criteria includes raw bit error rate.

In Example 24, the subject matter of Examples 17-24 (excluding the present Example) can optionally include at least one operation of:
(1) detecting a failure of the selected operational memory die, in response to detection of a failure of the selected operational memory die, disabling the failed operational memory die and replacing the failed operational memory die with the spare memory die wherein the spare memory die has data mirrored from the selected operational memory die prior to the detection of the failure of the selected operational memory die;
(2) reading data from the operational memory dies of the memory including the selected operational memory die;
attempting error correction of the read data if the read data contains an error;
if the error correction is unsuccessful, modifying the read data by replacing read data read from the selected operational memory die with read data read from the spare memory die prior to detection of a failure of the selected operational memory die; and
attempting error correction of the modified read data if the modified read data contains an error;
(3) cyclically performing maintenance of the memory in a plurality of maintenance cycles, each maintenance cycle including:
said determining memory performance of operational memory dies of the memory;
said selecting an operational memory die of the memory as a function of memory die performance; and
said mirroring data of the selected operational memory die to the spare memory die;
(4) cyclically performing refreshing of the memory in a plurality of refresh cycles wherein each maintenance cycle is performed in association with a refresh cycle;
(5) wherein said determining memory performance of operational memory dies of the memory includes accumulating over a period of time, comparative statistical performance data representing the comparative performance of each memory die of the memory with respect to a particular performance criteria, and wherein said selecting an operational memory die of the memory as a function of memory die performance includes selecting the operational memory die having the worst comparative performance over the period of time; and
(6) wherein the performance criteria includes raw bit error rate.

Example 25 is an apparatus, comprising:
  selection means for determining memory performance of operational memory dies of a memory, and selecting an operational memory die of the memory as a function of memory die performance; and
  data mirror means for mirroring data for the selected operational memory die to a spare memory die.

In Example 26, the subject matter of Examples 25-32 (excluding the present Example) can optionally include:
  die failure detection means for detecting failure of the selected operational memory die; and
  die replacement means for, in response detection of the failure of the selected operational memory die, disabling the failed operational memory die and replacing the failed operational memory die with the spare memory die wherein the spare memory die has data mirrored from the selected operational memory die prior to a detection of a failure of the selected operational memory die.

In Example 27, the subject matter of Examples 25-32 (excluding the present Example) can optionally include:
  error correction code means for reading data from the operational memory dies of the memory including the selected operational memory die, wherein the read data is encoded in accordance with an error correction code, the error correction code means having decoder means for decoding the encoded read data, error detection means for detecting an error in the decoded read data, and error correction means for attempting to correct a detected error in the decoded read data, wherein the error correction code means is further configured for, in response to a failure by the error correction means to correct a detected error in the decoded read data, reading data from the spare memory die wherein the read data is encoded in accordance with an error correction code, and substituting the encoded read data from the spare memory die for the encoded read data from the selected operational memory die.

In Example 28, the subject matter of Examples 25-32 (excluding the present Example) can optionally include wherein the decoder means is further configured for decoding the encoded read data which includes the encoded read data from the spare memory die, and wherein the error detection means is further configured for detecting an error in the decoded read data which includes the decoded read data from the spare memory die, and wherein the error correction means is further configured for correcting a detected error in the decoded read data which includes the decoded read data from the spare memory die.

In Example 29, the subject matter of Examples 25-32 (excluding the present Example) can optionally include cyclical predictive memory maintenance means for cyclically performing predictive maintenance of the memory in a plurality of maintenance cycles, wherein in each maintenance cycle, said selection means is further configured for determining in each maintenance cycle, the memory performance of the operational memory dies of the memory, and for selecting an operational memory die of the memory as a function of the memory die performance; and wherein said data mirror means is further configured for in each maintenance cycle, mirroring data for the selected operational memory die to the spare memory die.

In Example 30, the subject matter of Examples 25-32 (excluding the present Example) can optionally include cyclical refresh means for cyclically performing refreshing of the memory in a plurality of refresh cycles, wherein the predictive memory maintenance means is further configured for performing each maintenance cycle in association with a refresh cycle.

In Example 31, the subject matter of Examples 25-32 (excluding the present Example) can optionally include wherein said selection means includes means for determining memory performance of operational memory dies of the memory, including means for accumulating over a period of time, comparative statistical performance data representing the comparative performance of each memory die of the memory with respect to a particular performance criteria, and means for selecting an operational memory die of the memory as a function of the operational memory die having the worst comparative performance over the period of time.

In Example 32, the subject matter of Examples 25-32 (excluding the present Example) can optionally include wherein the performance criteria includes raw bit error rate.

Example 33 is an apparatus comprising means to perform a method as claimed in any preceding example.

Example 34 is machine-readable storage including machine-readable instructions, when executed, to implement a method or realize an apparatus or system as claimed in any preceding example.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus for use with a memory having a plurality of dies including a spare memory die, comprising:
    selection logic configured to determine memory performance of operational memory dies of a memory, and select an operational memory die of the memory for potential replacement as a function of memory die performance; and
    data mirror logic configured to mirror to a spare memory die in anticipation of a potential failure and subsequent replacement of the selected operational memory die, data written to the selected operational memory die after the selected operational memory die was selected for potential replacement and prior to a potential failure and replacement of the selected operational memory die.

2. The apparatus of claim 1 further comprising:
    die failure detection logic configured to detect failure of the selected operational memory die; and
    die replacement logic configured to, in response detection of the failure of the selected operational memory die, disable the failed operational memory die and replace the failed operational memory die with the spare memory die wherein the spare memory die has data mirrored from the selected operational memory die prior to a detection of a failure of the selected operational memory die.

3. The apparatus of claim 1, further comprising:
    error correction code logic configured to read data from the operational memory dies of the memory including the selected operational memory die, wherein the read data is encoded in accordance with an error correction code, the error correction code logic having decoder logic configured to decode the encoded read data, error detection logic configured to detect an error in the decoded read data, and error correction logic configured to attempt to correct a detected error in the decoded read data, wherein the error correction code logic is further configured to, in response to a failure to the error correction logic to correct a detected error in the decoded read data, read data from the spare memory die wherein the read data is encoded in accordance with an error correction code, and substitute the encoded read data from the spare memory die for the encoded read data from the selected operational memory die.

4. The apparatus of claim 3 wherein the decoder logic is further configured to decode the encoded read data which includes the encoded read data from the spare memory die, and wherein the error detection logic is further configured to detect an error in the decoded read data which includes the decoded read data from the spare memory die, and wherein the error correction logic is further configured to correct a detected error in the decoded read data which includes the decoded read data from the spare memory die.

5. The apparatus of claim 1 further comprising cyclical predictive memory maintenance logic configured to cyclically perform predictive maintenance of the memory in a plurality of maintenance cycles, wherein in each maintenance cycle, said selection logic is further configured to determine in each maintenance cycle, the memory performance of the operational memory dies of the memory, and to select an operational memory die of the memory for potential replacement as a function of the memory die performance; and wherein said data mirror logic is further configured to in each maintenance cycle, mirror data for the selected operational memory die to the spare memory die.

6. The apparatus of claim 5 further comprising cyclical refresh logic configured to cyclically perform refreshing of the memory in a plurality of refresh cycles, wherein the predictive memory maintenance logic is further configured to perform each maintenance cycle in association with a refresh cycle.

7. The apparatus of claim 1 wherein said selection logic includes logic configured to determine memory performance of operational memory dies of the memory, including logic configured to accumulate over a period of time, comparative statistical performance data representing the comparative performance of each memory die of the memory with respect to a particular performance criteria, and logic configured to select an operational memory die of the memory for potential replacement as a function of the operational memory die having the worst comparative performance over the period of time.

8. The apparatus of claim 7 wherein the performance criteria includes raw bit error rate.

9. A system for use with a display, comprising:
    a processor;
    a video controller configured to control the display in response to the processor;
    a memory configured to store data from the processor and having a plurality of memory dies including a spare memory die; and
    a memory controller configured to control the memory, said memory controller including:
        selection logic configured to determine memory performance of operational memory dies of the memory, and select an operational memory die of the memory for potential replacement as a function of memory die performance; and
        data mirror logic configured to mirror to a spare memory die in anticipation of a potential failure and subsequent replacement of the selected operational memory die, data written to the selected operational memory die after the selected operational memory die was selected for potential replacement and prior to a potential failure and replacement of the selected operational memory die.

10. The system of claim 9 wherein the memory controller further includes:

die failure detection logic configured to detect failure of the selected operational memory die; and die replacement logic configured to, in response detection of the failure of the selected operational memory die, disable the failed operational memory die and replace the failed operational memory die with the spare memory die wherein the spare memory die has data mirrored from the selected operational memory die prior to a detection of a failure of the selected operational memory die.

11. The system of claim 9, wherein the memory controller further includes:

error correction code logic configured to read data from the operational memory dies of the memory including the selected operational memory die, wherein the read data is encoded in accordance with an error correction code, the error correction code logic having decoder logic configured to decode the encoded read data, error detection logic configured to detect an error in the decoded read data, and error correction logic configured to attempt to correct a detected error in the decoded read data, wherein the error correction code logic is further configured to, in response to a failure by the error correction logic to correct a detected error in the decoded read data, read data from the spare memory die wherein the read data is encoded in accordance with an error correction code, and substitute the encoded read data from the spare memory die for the encoded read data from the selected operational memory die.

12. The system of claim 11 wherein the decoder logic is further configured to decode the encoded read data which includes the encoded read data from the spare memory die, and wherein the error detection logic is further configured to detect an error in the decoded read data which includes the decoded read data from the spare memory die, and wherein the error correction logic is further configured to correct a detected error in the decoded read data which includes the decoded read data from the spare memory die.

13. The system of claim 9 wherein the memory controller further includes cyclical predictive memory maintenance logic configured to cyclically perform predictive maintenance of the memory in a plurality of maintenance cycles, wherein in each maintenance cycle, said selection logic is further configured to determine in each maintenance cycle, the memory performance of the operational memory dies of the memory, and to select an operational memory die of the memory for potential replacement as a function of the memory die performance; and wherein said data mirror logic is further configured to in each maintenance cycle, mirror data for the selected operational memory die to the spare memory die.

14. The system of claim 13 wherein the memory controller further includes refresh logic configured to cyclically performing refreshing of the memory in a plurality of refresh cycles, wherein the cyclical predictive memory maintenance logic is further configured to perform each maintenance cycle in association with a refresh cycle.

15. The system of claim 9 wherein said selection logic includes logic configured to determine memory performance of operational memory dies of the memory, including logic configured to accumulate over a period of time, comparative statistical performance data representing the comparative performance of each memory die of the memory with respect to a particular performance criteria, and logic configured to select an operational memory die of the memory for potential replacement as a function of the operational memory die having the worst comparative performance over the period of time.

16. The system of claim 15 wherein the performance criteria includes raw bit error rate.

17. A method, comprising:

determining memory performance of operational memory dies of a memory;

selecting an operational memory die of the memory for potential replacement as a function of memory die performance; and mirroring to a spare memory die in anticipation of a potential failure and subsequent replacement of the selected operational memory die, data written to the selected operational memory die after the selected operational memory die was selected for potential replacement and prior to a potential failure and replacement of the selected operational memory die.

18. The method of claim 17 further comprising detecting a failure of the selected operational memory die, in response to detection of a failure of the selected operational memory die, disabling the failed operational memory die and replacing the failed operational memory die with the spare memory die wherein the spare memory die has data mirrored from the selected operational memory die prior to the detection of the failure of the selected operational memory die.

19. The method of claim 17, further comprising:

reading data from the operational memory dies of the memory including the selected operational memory die;

attempting error correction of the read data if the read data contains an error;

if the error correction is unsuccessful, modifying the read data by replacing read data read from the selected operational memory die with read data read from the spare memory die prior to detection of a failure of the selected operational memory die; and attempting error correction of the modified read data if the modified read data contains an error.

20. The method of claim 17 further comprising cyclically performing maintenance of the memory in a plurality of maintenance cycles, each maintenance cycle including:

said determining memory performance of operational memory dies of the memory;

said selecting an operational memory die of the memory for potential replacement as a function of memory die performance; and said mirroring data of the selected operational memory die to the spare memory die.

21. The method of claim 17 further comprising cyclically performing refreshing of the memory in a plurality of refresh cycles wherein each maintenance cycle is performed in association with a refresh cycle.

22. The method of claim 17 wherein said determining memory performance of operational memory dies of the memory includes accumulating over a period of time, comparative statistical performance data representing the comparative performance of each memory die of the memory with respect to a particular performance criteria, and wherein said selecting an operational memory die of the memory for potential replacement as a function of memory die performance includes selecting the operational memory die having the worst comparative performance over the period of time.

23. The method of claim 22 wherein the performance criteria includes raw bit error rate.

* * * * *